United States Patent [19]

Tamura et al.

[11] Patent Number: 4,631,979
[45] Date of Patent: Dec. 30, 1986

[54] POWER TRANSMISSION MECHANISM EQUIPPED WITH FLUID AND CENTRIFUGAL CLUTCH

[75] Inventors: Kazuhisa Tamura, Hirakata; Shigeru Takeshita, Neyagawa; Takao Fukunaga, Hirakata, all of Japan

[73] Assignee: Kabushiki Kaisha Daikin Seisakusho, Osaka, Japan

[21] Appl. No.: 568,467

[22] Filed: Jan. 5, 1984

[30] Foreign Application Priority Data

Feb. 9, 1983 [JP] Japan ................... 58-20793

[51] Int. Cl.⁴ .............................................. F16H 47/00
[52] U.S. Cl. ....................................... 74/730; 192/3.31
[58] Field of Search ................ 74/730, 745, 731, 732, 74/688, 689; 192/3.26, 3.25, 3.31, 3.32, 103 B, 3.21, 3.27, 105 BA

[56] References Cited

U.S. PATENT DOCUMENTS

| | | | |
|---|---|---|---|
| 2,355,709 | 8/1944 | Dodge | 192/3.25 |
| 2,415,894 | 2/1947 | Lemon | 192/3.21 |
| 2,797,594 | 7/1957 | Grattan | 74/731 |
| 3,156,335 | 1/1964 | Nelden | 192/103 B |
| 3,197,004 | 7/1965 | Salsbury | 192/103 B |
| 3,378,118 | 4/1968 | Maurice | 74/730 |
| 3,526,305 | 9/1970 | August | 74/732 |
| 4,004,417 | 1/1977 | Woody et al. | 192/3.31 X |
| 4,063,623 | 12/1977 | Ivey | 192/103 B |
| 4,113,075 | 9/1978 | Walker | 192/3.31 |
| 4,125,037 | 11/1978 | Palmer et al. | 74/732 |
| 4,157,136 | 6/1979 | Salle | 192/3.31 |
| 4,203,288 | 5/1980 | Nichols | 192/3.31 |
| 4,206,824 | 6/1980 | Klink | 192/3.31 |
| 4,241,618 | 12/1980 | Smirl | 74/689 |
| 4,305,493 | 12/1981 | Silberschlag | 192/3.31 |

FOREIGN PATENT DOCUMENTS

| | | | |
|---|---|---|---|
| 55-01099 | 5/1980 | Japan | 192/3.31 |
| 0049456 | 5/1981 | Japan | 74/689 |

Primary Examiner—Kenneth J. Dorner
Assistant Examiner—David Novais
Attorney, Agent, or Firm—Armstrong, Nikaido, Marmelstein & Kubovcik

[57] ABSTRACT

A power transmission mechanism equipped with a fluid coupling, an input shaft thereof interconnected to a power source being interconnected through the fluid coupling to an output shaft, and the output shaft being interconnected to a forward-rearward changeover mechanism including a speed changer; characterized by that forward-rearward changeover can be performed by providing a clutch mechanism in a housing of said fluid coupling, which automatically disengages a connection between the input shaft and the output shaft when the power source is in idling condition, and automatically engages it when the power source exceeds the idling condition.

3 Claims, 8 Drawing Figures

POWER TRANSMISSION MECHANISM EQUIPPED WITH FLUID AND CENTRIFUGAL CLUTCH

FIELD OF THE INVENTION

This invention relates to a power transmission mechanism equipped with fluid coupling employed in an industrial vehicle such as an automobile or a forklift etc.

DESCRIPTION OF THE PRIOR ART

In FIG. 1 showing a schematic vertical sectional side view of a conventional power transmission mechanism equipped with fluid coupling, an input shaft 103 of a fluid coupling 102 is interconnected to a crank shaft of an engine 101, and an impeller 104 connected to the input shaft 103 incorporates an impeller blade 105 integrally therewith and has a guide pipe 107 concentric with an out put shaft 106 on an inner peripheral portion of the impeller 104. The guide pipe 107 is connected to a gear pump 108 so as to drive the gear pump 108, and turbine wheel 109 facing the impeller blade 105 is interconnected to the output shaft 106 integrally therewith. Further, the output shaft 106 is interconnected to an input shaft 113 of a foreward-rearward changeover mechanism 112 through a V-belt type stepless speed changer 110 and a hydraulic clutch 111. The hydraulic clutch 111 is so designed as to be actuated by hydraulic pressure from the control valve 114.

When the engine 101 operates to rotate the input shaft 103, the impeller 104 also rotates integrally with it. In this instance, the impeller blade 105 renders working fluid to flow in the direction of $X_1$, a torque of the input shaft 103 is transmitted from the impeller 104 through the working fluid to the turbine wheel 109. Thus, torque is transmitted to the output shaft 106. The torque transmitted to the output shaft 106 is applied through the V-belt type stepless speed changer 110 and the hydraulic clutch 111 to the normally-meshing forward-rearward changeover mechanism 112, and is delivered from the mechanism 112 for forward driving or for rearward driving. Here, when changeover operation is performed in the forward-rearward changeover mechanism 112, hydraulic pressure applied on the clutch 111 from a control valve 114 is released to disengage the clutch 111. As the result, the torque from the output shaft 106 is not transmitted to the mechanism 112 so that the forward-rearward changeover operation becomes possible. On the other hand, when the forward-rearward changeover operation is completed, the hydraulic pressure from the control valve 114 is applied to the clutch 111 to bring the clutch into engaged state, thus the torque being transmitted to the mechanism 112.

In the above-mentioned conventional composition, however, there is a disadvantage that it is necessary to separately provide the hydraulic clutch in order to perform the forward-rearward changeover operation, which will lead to an increase in the overall size of the power transmission mechanism.

SUMMARY OF THE INVENTION

This invention is intended, in consideration of the above-mentioned disadvantage, to decrease the overall size of the power transmission mechanism by the use of the fluid coupling having in its housing the clutch mechanism (centrifugal clutch, hydraulic clutch, electro-magnetic clutch etc.).

For the purpose of accomplishing the above object in this invention; in a power transmission mechanism equipped with fluid coupling wherein an input shaft interconnected to a power source is interconnected through a fluid coupling to an output shaft, and the output shaft is interconnected to a forward-rearward changeover mechanism including a speed changer; forward-rearward changeover operation is performed by providing in a housing a clutch mechanism which automatically disengages connection between the input shaft and the output shaft when the power source is in idling condition, and automatically engages them when it exceeds the idling condition.

DETAILED DESCRIPTION OF THE INVENTION

Figure 2:
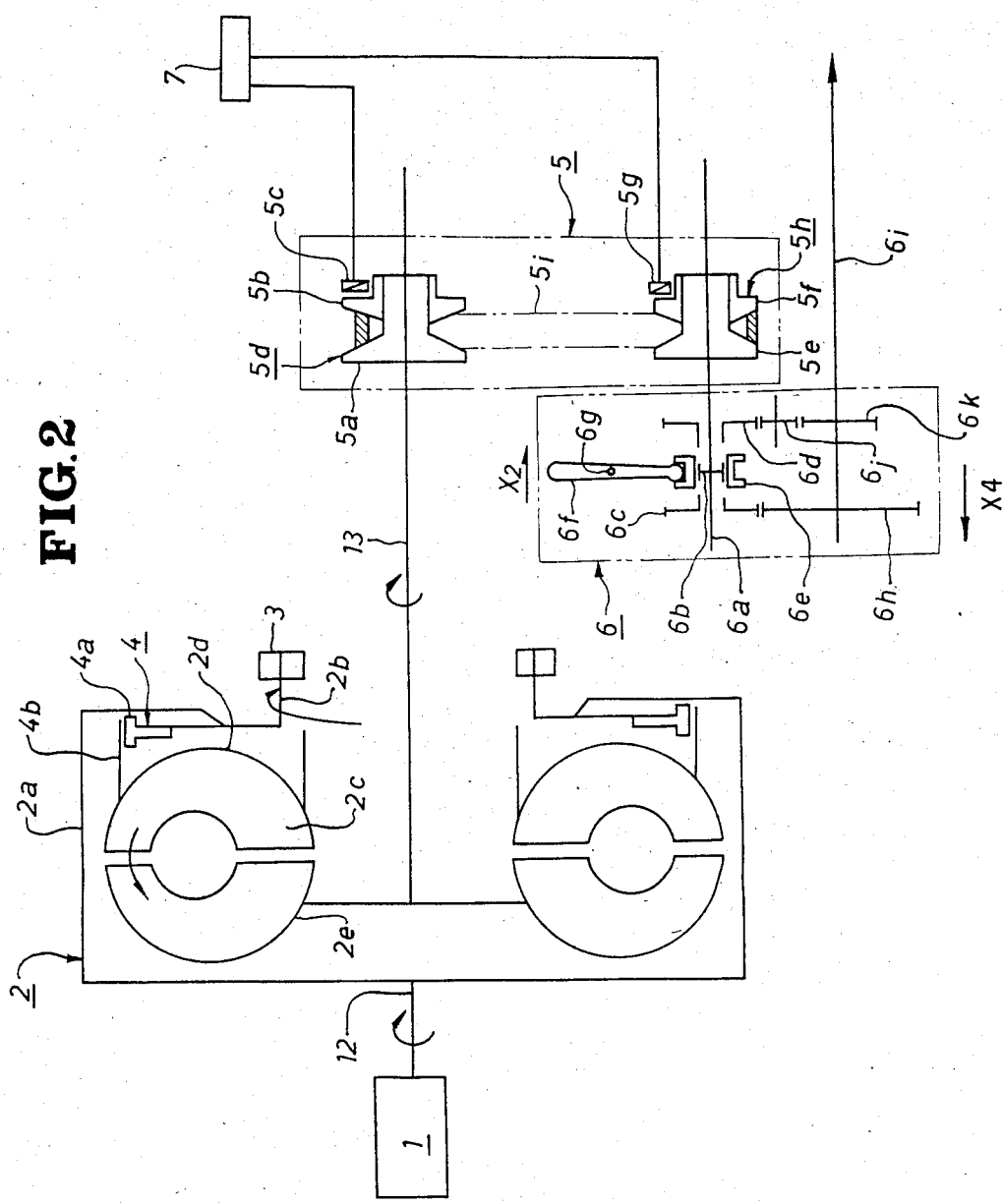
FIG. 2 is a schematic vertical sectional side view of the power transmission mechanism of the present invention.

In FIG. 2, an input shaft 12 of a fluid coupling is interconnected to a crank shaft of an engine 1, a housing 2a connected integrally with the input shaft 12 integrally incorporates a guide pipe 2b concentric with an output shaft 13, and the pipe 2b is connected to a gear pump 3 so as to always drive the pump 3. An impeller 2d having an impeller blade 2c is disposed in an inside of the housing 2a, and a centrifugal clutch 4 (an example of a clutch mechanism), which provides a disengaged connection when an input side is under idling condition and provides an engaged connection when the input side exceeds idling condition, is interposed between the housing 2a and the impeller 2d. Further, a turbine wheel 2e facing the impeller blade 2c is connected integrally with the output shaft 13, and said output shaft 13 is connected to a V-belt type stepless speed changer 5.

In the V-belt type stepless speed changer, a movable flange 5b slidably fits onto a boss of a fixed flange 5a fixed to the output shaft 13 serving also as an input shaft of the speed changer 5. In order to form a V-shaped annular groove facing against the fixed flange 5a, a hydraulic piston 5c drive the movable flange 5b in the axial direction. On the other hand, a movable flange 5f slidably fits onto a boss of a fixed flange 5e fixed to an input shaft 6a of a below-mentioned forward-rearward changeover mechanism 6 to form a V-shaped annular groove facing against the fixed flange 5e. A hydraulic piston 5g drive the movable flange 5f in the axial direction. Further, both the hydraulic pistons 5c, 5g are connected respectively to a servo-valve 7 interconnected to a hydraulic power source. V-belt 5i is interposed between both the pulleys 5d, 5h.

In the forward-rearward changeover mechanism 6, the input shaft 6a is fixed to the output side pulley 5h. Collar 6b having an external spline, is fixed to the output shaft 6a. Forward gear 6c and a rearward gear 6d both fitted rotatably onto the shaft 6a and are disposed thereon with the collar 6b interposed therebetween. Both the gears 6c, 6d have respectively external splines having the same radius as the collar 6b on inner peripheral portions of the sides of the collar 6b, so that a slider 6e which slidably fits onto the collar 6b can fit also onto both the gears 6c, 6d. Slider 6e is disposed that it can slide between the collar 66 and both the gears 6c, 6d by pivoting a shift york 6f on a fulcrum point 6g. The foreward gear 6c is interconnected through a gear 6h to an output shaft 6i, and the rearward gear 6d is interconnected through a reversing gear 6j and a gear 6k to the output shaft 6i.

The function of this mechanism will be described thereunder. When the engine 1 operates to rotate the input shaft 12, the housing 2a also rotates integrally with it. Under the idling condition of the engine, a shoe 4a of the centrifugal clutch 4 is in disengaged state due to insufficiency of centrifugal force. Torque of the input side is not transmitted to the impeller wheel 2d, so that only the gear pump 3 is driven. Therefore, the torque is not transmitted, through the output 13 and the V-belt type stepless speed changer 5, to the input shaft 6a of the forward-rearward changeover mechanism 6. Under this condition, the collar 6b is coupled to the foreward gear 6c or the rearward gear 6d by pivoting the shift fork in the direction of X2 or in the direction of X4 for sliding the slider 6e. The gear change of this case can be performed smoothly because the torque is not transmitted from the input side to the input shaft 6a.

When, in the next stage, rotational speed of the engine 1 is increased for the purpose of changing the operation mode from idling to running, the shoe 4a moves toward the outer peripheral side to bring the centrifugal clutch to the engaged condition. Torque is transmitted to the impeller 2d and further transmitted through the working oil and the turbine wheel 2e to the output shaft 13. Naturally, the gear pump 3 continues to actuate also in this case. The torque transmitted to the output shaft 13 is applied to the V-belt type stepless speed changer 5. The speed changer functioning in the following manner. Namely, driving factors of a vehicle such as a carburetor throttle opening, a vehicle speed, a rotational speed of the input side pulley 5d etc. are detected by means of a speed senser etc., opening/closing of the servo-valve 7 is controlled by an electric control circuit (not shown). The output signals control the rotational speed of the output side pulley 5h. Thus the hydraulic pressure supplied to the hydraulic piston 5c of the input side pulley 5d is regulated according to the driving condition of a vehicle. The hydraulic pressure supplied to the hydraulic piston 5g of the output side pulley 5h is also regulated in the same manner. When the hydraulic pressure supplied to the hydraulic piston 5c is increased in this instance, a width of V-groove formed between both flanges 5a, 5b of the input side pulley 5d becomes narrower, and the V-belt 5i moves toward outer peripheral sides (those giving larger radii) of the both flanges 5a, 5b while rotating. The V-belt 5i is pulled toward the input side pulley 5d by the above-mentioned movement of V-belt so that, at the side of the output pulley 5h, the V-belt 5i moves the movable flange 5f against the pressure of the hydraulic piston 5g and widen a width of V-groove formed between the both flanges 5e, 5f, thus moving itself toward inner peripheral sides (those giving smaller radii) of the both flanges 5e, 5f. As the result, a reduction ratio becomes smaller. On the contrary, when the hydraulic pressure supplied to the hydraulic piston 5c is decreased, the width of the V-groove of the input side pulley 5d becomes wider and the V-belt 5i moves toward the side at which its radius becomes small, and the width of the V-groove of the output side pulley 5h becomes narrower and the V-belt 5i moves toward the side at which its radius becomes larger. As the result, the reduction ratio becomes larger. The torque transmitted from the output side pulley 5h to the input shaft 6a is applied through the forward-rearward changeover mechanism 6 to the output shaft 6i in the following manner. Namely, the slider 6e which slidably spline fits onto the collar 6b fixed to the input shaft 6a, has previously been fitted to either of the forward gear 6c or the rearward gear 6d by pivoting the shift fork 6f under the aforementioned idling condition. When, for example, the slider 6e connects the collar 6b and the forward gear 6c in this state, the torque applied to the input shaft 6a is delivered through the collar 6b, the slider 6e, the gears 6c, 6h to the output shaft 6i. On the contrary, when the slider 6e connects the collar 6b and the rearward gear 6d, the torque applied to the input shaft 6a is delivered through the collar 6b, the slider 6e, the gears 6d, 6j, 6k, to the output shaft 6i in the form of the reversed torque against the case where the above-mentioned torque is transmitted to the forward gear 6c. Then, in order to change the operation mode from the above-mentioned power transmitting to the forward-rearward changeover, the engine 1 is returned to the idling state. By this operation, the centrifugal clutch 4 is brought into the disengaged state and the torque from the input side is not transmitted to the input shaft 6a of the forward-rearward changeover mechanism 6. Thus the gear changing operation is performed smoothly by pivoting the shift fork 6f.

Figure 1:
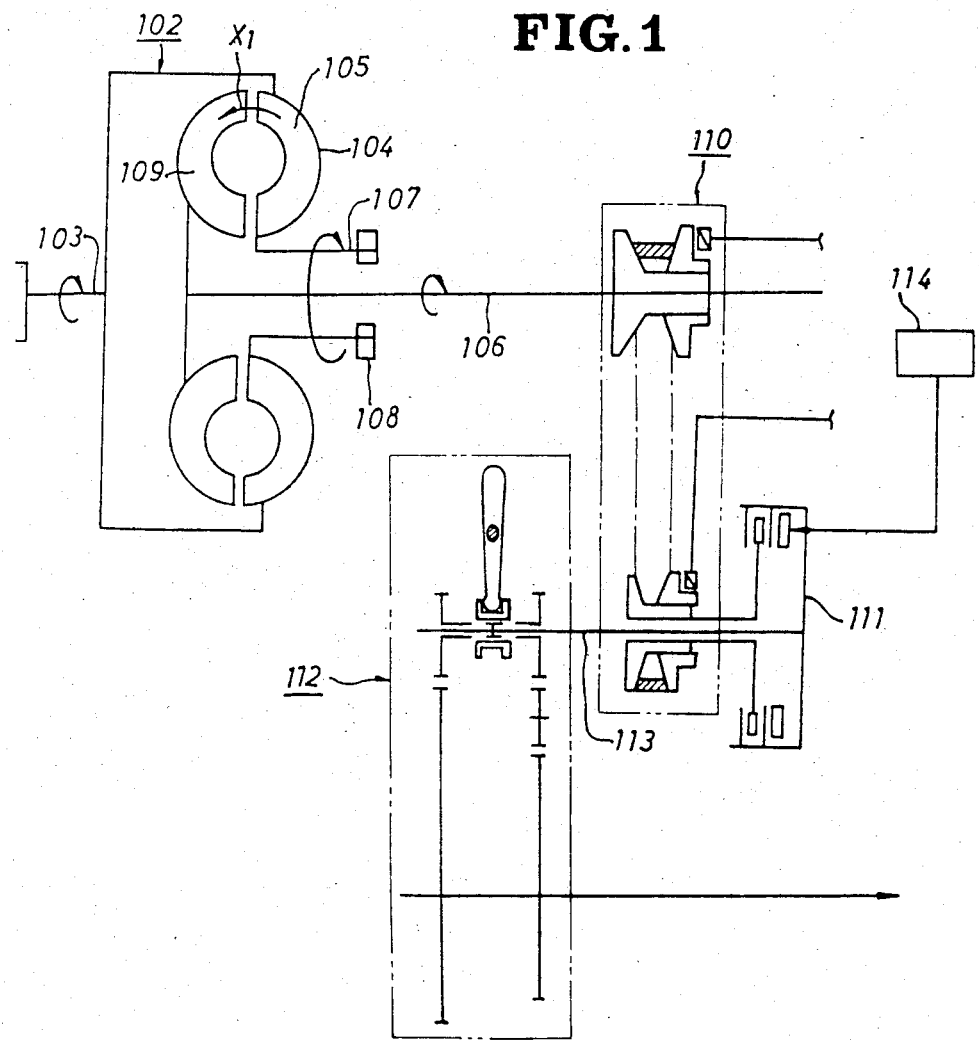
FIG. 1 is a schematic vertical sectional side view of a conventional power transmission mechanism.

According to the present invention as mentioned above; the power transmission mechanism equipped with fluid coupling, wherein the input shaft 12, interconnected to the power source (for example, the engine 1) is interconnected through the fluid coupling 2 to the output shaft 13, and the output shaft 13, connected to the forward-rearward changeover mechanism 6, is provided with the clutch mechanism (for example, the centrifugal clutch 4) in the housing 2a of the fluid coupling 2, which automatically disengages connection between the input shaft 12 and the output shaft 13 when the power source is in idling condition, and automatically engages them when it exceeds the idling condition. Therefore, there is an advantage that the separately required conventional hydraulic clutch 111 and the control unit required for the purpose of controlling it as shown in FIG. 1 become unnecessary to enable a reduction in the overall size of the power transmission mechanism. Further, since the torque is cut off at the fluid coupling 2 under the idling state, according to the present invention, the advantages are obtainable that vibrations from the power source, during idling, are isolated and a load therefrom is lightened to improve fuel consumption.

Figure 3:
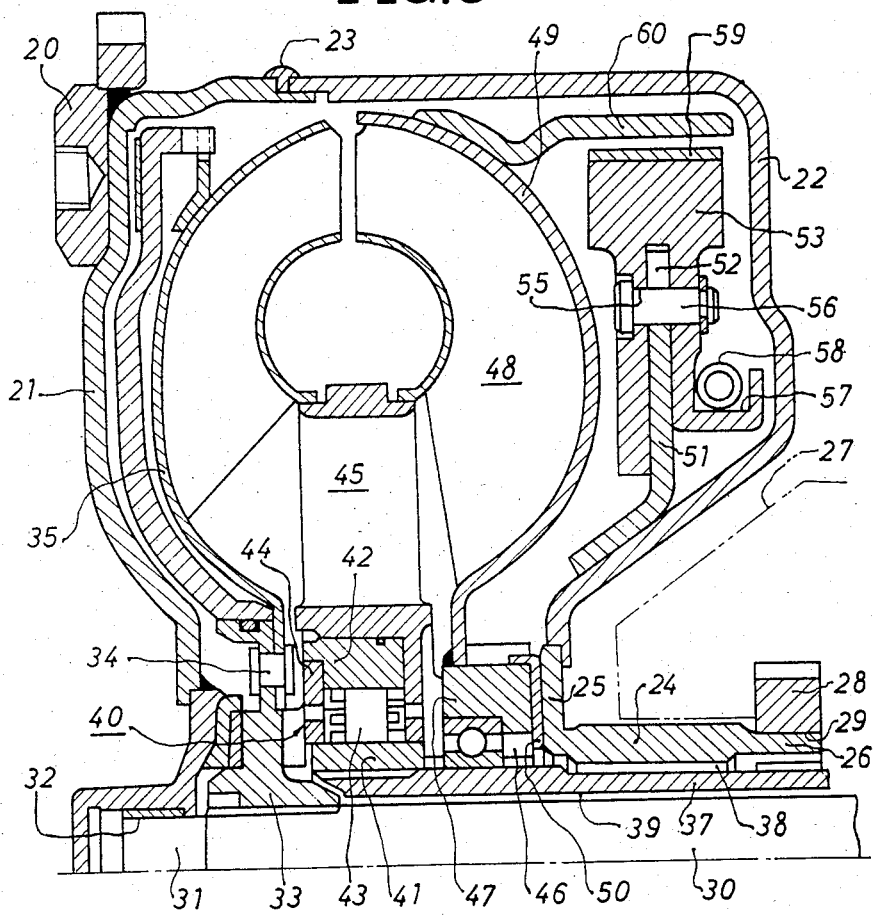
FIG. 3 is a partially sectional vertical side view showing an embodiment of a torque converter portion.

The similar object will be accomplished by the use of a torque converter (a kind of the fluid coupling) in place of the fluid coupling shown in FIG. 2 employed in the power transmission mechanism according to the present invention, so that a more detailed embodiment using the torque converter will be described hereunder. FIG. 3 shows a partially sectional vertical side view of the embodiment. A ring 20 fastened integrally to an engine flywheel (not shown) with bolts is welded to a rotary housing 21, and an outer periphery of the housing 21 and an outer periphery of an impeller housing 22 are welded together at a portion 23. An inner periphery of the impeller housing 22 is welded to an outer periphery of a flange 25 of a guide pipe 24, and a tip end of the guide pipe 24 is notched to form a claw 26 thereat. The claw 26 fits into a recessed portion 29 provided at an inner peripheral side of the gear 28 in a gear pump housing 27, so that a gear pump is actuated by rotation of the claw 26.

On the other hand, an output shaft 30 is disposed concentrically with and spaced apart from the guide pipe 24 in an inside thereof, and a tip end 31 of the output shaft 30 is slidingly rotatably fitting in and supported by a recessed portion 32 provided at a central part of the rotary housing 21. Further, a turbine hub 33 spline fits onto a spline formed on an outer periphery of the output shaft 30, and a turbine wheel 35 is securely fastened to an outer peripheral portion of the hub 33 through means of a plurality of rivets 34.

Between the guide pipe 24 and the output shaft 30 is disposed a stator shaft 37 concentrically with and spaced apart from the pipe 24 and shaft 30. Between the guide pipe 24 and the stator shaft 37 is formed a working oil supply passage 38, and between the output shaft 30 and the stator shaft 37 is formed a working oil return passage 39 respectively. An external spline is formed at a tip end of the stator shaft 37, and an inner race 41 of a one-way clutch section 40 spline fits onto the external spline. Among members forming the one-way clutch section 40, 42 is an outer race, 43 is a one-way clutch, and 44 is a one-way clutch retainer. A stator wheel 45 made of cast iron is fitted onto and fixed to an outer periphery of the outer race 42. A boss 47 having on its inner peripheral side a bearing rotatably fits onto the stator shaft between the stator wheel 45 and the flange 25, and an inner peripheral portion of an impeller shell 49 having an impeller blade 48 is welded to an outer peripheral portion of the boss 47. A thrust washer 50 is interposed between the boss 47 and the flange 25 of the guide pipe 24, and the boss 47 is freely rotatable also relatively to the guide pipe 24.

Figure 5:
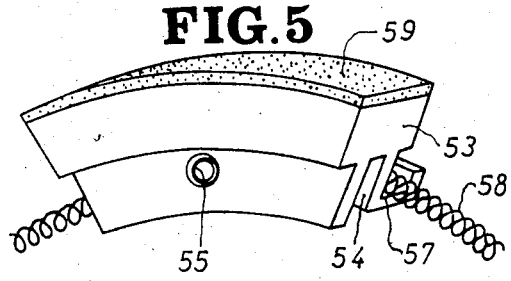
FIG. 5 is an oblique view of a shoe.
Figure 4:
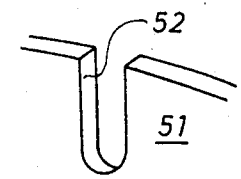
FIG. 4 is a partial oblique view of a disc of FIG. 3.

An inner periphery of a disc 51 extending radially at the right angle to the center axis is fixed to a surface at the shell 49 side of the impeller housing 22 by means of bolts or sport-welding, and notches 52 opening radially outwardly as shown in FIG. 4 are provided at several spots circumferentially with the same distances left therebetween on an outer peripheral portion of the disc 51. Further, a shoe 53 is disposed on an outer periphery of the disc 51. The shoe 53 has a groove 54 and a hole 55 at its inner peripheral side as shown in FIG. 5, and the groove 54 fits onto an outer peripheral portion of the disc 51 of FIG. 1 and a pin 56 parallel to the center axis and held by the hole 55 fits into the notch 52, so that the shoe 53 is held by the disc 51 freely slidingly only in the radial direction. Further, a spring holder 57 extending in the circumferential direction is provided at the inner peripheral side of the shoe 53, and an annular coil spring 58 is tensely provided in the spring holder 57 to always pull the shoe 53 toward the center axis. A lining 59 is fixed to an outer peripheral surface of the shoe 53, an approximately cylindrical casing 60 is disposed outwardly of the lining 59 with a small clearance left therebetween, and one end of the casing is welded to the shell 49.

The function of this transmission mechanism will be described hereunder. A torque applied to the ring 20 is transmitted through the rotary housing 21 to the housing 22. If the operation mode is under the idling condition in this instance, a centrifugal force generated by the shoe 53 cannot overcome the force of the coil spring 58 so that the lining 59 never presses on an inner peripheral surface of the casing 60. Consequently, the torque of the housing 22 is never transmitted to the shell 49. On the contrary, the guide pipe 24 always rotates when the engine rotates because it is formed integrally with the housing 22. Therefore, the gear pump always actuates during engine rotation to circulate working oil in places requiring lubrication. When, in the next stage, the rotational speed of engine is increased in order to change the operation mode from the idling condition to the running condition, a speed of housing 22 will also increase. Then, the centrifugal force generated by the shoe 53 increases to overcome the force of the spring 58, thus the lining 59 presses on the inner peripheral surface of the casing 60 to transmit the torque to the shell 49. The torque transmitted to the shell 49 is further transmitted, similarly to the conventional manner, through working oil filled in the torque converter and through the turbine wheel 35 to the output shaft 30.

The above-mentioned embodiment functions as described above, and the torque is never delivered therefrom in the idling operation.

Figure 6:
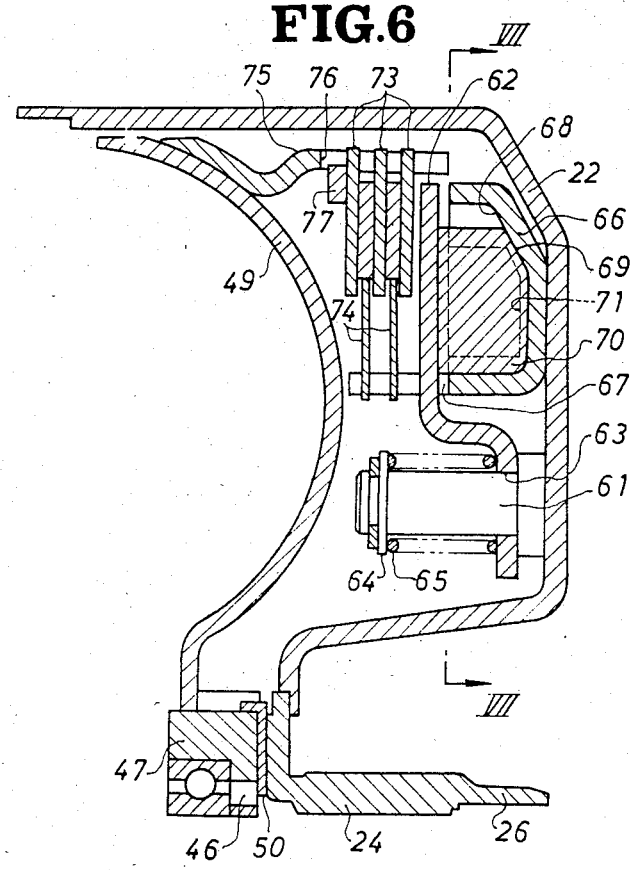
FIG. 6 is a partially sectional vertical side view showing another embodiment.
Figure 7:
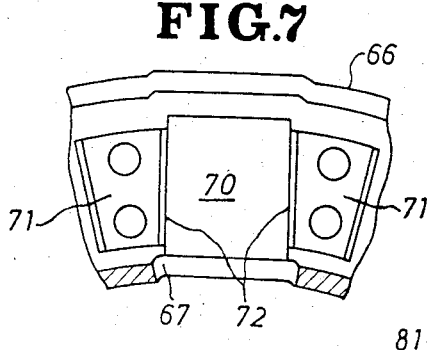
FIG. 7 is a partially sectional view taken on the line VII—VII of FIG. 6.

Next, another embodiment will be described hereunder, FIG. 6 is a partially sectional vertical side view showing only a vicinity of the housing 22 and the impeller shell 49. Several pins 61 parallel to the center axis are welded to a surface facing the side of the shell 49 of the housing 22, and holes 63 provided on an inner periphery of a radial pressure plate 62 fit freely slidingly onto the pins 61. A spring seat 64 is provided at the shell 49 side of the pin 60, and a coil spring 65 is compressively provided between the plate 62 and the spring seat 64 to press the plate 62 apart from the shell 49. An annularly shaped U-sectional guide plate 66 is welded to the housing 22 at an outer peripheral side of the pin 61, and an outer peripheral portion of the plate 62 fits into an inner peripheral side notch 67 of the guide plate 66. An outer peripheral portion of the guide plate 66 has a cam surface 68 which inclines and comes near to the plate 62 radially outwardly with an increase of its radius, and a weight 70 having an inclining surface 69 corresponding to the cam surface 68 is disposed on several places of the same circumference between the both plates 62, 66. A guide 71 is disposed between adjacent weights 70 and ribetted or welded to the guide plate 66 as shown in FIG. 7, and the weight 70 is supported by opposing guide surfaces 72, 72 of the adjacent guide 71, 71 to be freely sliding only in the radial direction. On the opposite side of the weight 70, with the pressure plate 62 interposed therebetween, there laid annular pressure plates 73 and friction plates 74 alternately. An inner peripheral portion of the friction plate 74 fits into the notch 67 of the guide plate 66 to be supported freely slidingly only in the direction parallel to the center axis with respect to the guide plate 66. An outer peripheral portion of the pressure plate 73 fits into a notch 76 provided on an approximately cylindrical casing 25 to be supported freely slidingly only in the direction parallel to the center axis. Further, a snap ring 77 is fitted to the notch 76 at a portion near to the shell 49 for the purpose of sandwiching the pressure plate 73 and the friction plate 74 in cooperation with the pressure plate 62. An end portion at the shell 49 side of the casing 75 is welded to the shell 49.

The function of this embodiment will be described hereunder. In the idling operation, a centrifugal force generated by the weight 70 is small and the weight 70 does not slide radially outwardly on the cam surface 68 of the guide plate 66 because a rotational speed of the housing 22 is low, so that the weight never presses the pressure plate 62 against the pressure plate 73. Consequently, a torque is never transmitted from the housing 22 to the shell 49 due to a slippage between the pressure plate 73 and the friction plate 74. When, in the next stage, the rotational speed of engine is increased in order to change the operation mode from the idling condition to the running condition, a speed of housing 22 will also increase to enlarge a centrifugal force generated by the weight 70. As the result, the weight 70 slides radially outwardly and presses the pressure plate 62 against the pressure plate 73 by overcoming the force of the coil spring 65, the pressure plate 73 is connected to the friction plate 74 due to a friction force, thus the torque being transmitted from the housing to the shell 49.

In this embodiment, the effect peculiar to this invention is also obtainable.

Figure 8:
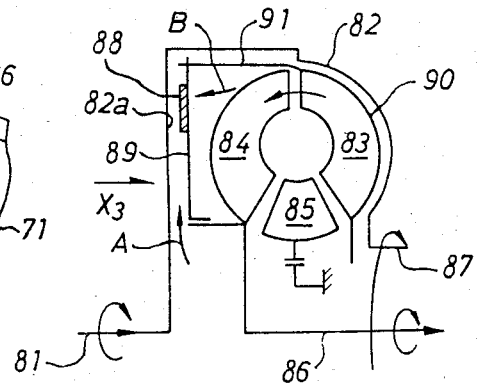
FIG. 8 is a partially sectional schematic vertical side view of further another embodiment.

Moreover, as shown in FIG. 8, the clutch mechanism may be arranged at the back side of the turbine wheel. In FIG. 8, 81 is an input shaft, 82 is a housing, 83 is an impeller, 84 is a turbine wheel, 85 is a stator wheel, 86 is an output shaft, 87 is a guide pipe which drives a gear pump (not shown), 88 is a facing, 89 is a pressure plate to which the facing 88 is fixed, 90 is an impeller shall, and 91 is a cylindrical member fixed to the shell and is engaged with the plate 89 freely slidingly only in the axial direction.

In FIG. 8, when a torque is applied to the input shaft 81 to cause rotation thereof, the housing 82 will also rotate together with the shaft. It is so deviced under the idling condition that a hydraulic pressure is induced to the side of arrow A by means of a hydraulic control mechanism operatively controlled by a speed sensor (not shown) etc., and the pressure plate 89 slides in the direction of arrow X3 due to this hydraulic pressure to bring the clutch into a disengaged condition (corresponding to that shown in FIG. 8). On the other hand, when the rotational speed of engine exceeds the idling speed, the hydraulic pressure is changed over to be induced to the side of arrow B, and the pressure plate 89 slides in the direction opposite to the arrow X3 to bring the clutch into an engaged condition.

When embodying the present invention, the clutch mechanism having the pressure plate 89 such as of FIG. 8 may be employed in case of arranging the clutch mechanism at the back side of the impeller 2d as shown in FIG. 2, and the centrifugal clutch 4 shown in FIG. 2 (including the clutch mechanisms shown in FIG. 3 and FIG. 6) may be employed in case of arranging the clutch mechanism at the back side of the turbine wheel 84 as shown in FIG. 8. Further, a hydraulic clutch or an electromagnetic clutch may also be employed in place of the above-mentioned clutch mechanisms. On the other hand, a planetary gear type speed changer, for example, may be used as the speed changer without being limited to the above stepless speed changer 5. Further, for the foreward-rearward changeover mechanism, a planetary gear type etc. may be employed in place of the normally-meshing gear type.

Incidentally, according to the embodiments shown in the figures, the guide pipes 2b, 24, 87 are fixed to the housings 2a, 22, 82 and the gear pumps are driven by the pipes 2b, 24, 87, so that the gear pumps can securely be driven during engine running independently of the engaged and disengaged conditions between the housings 2a, 22, 82 and the impeller 2d (impeller shells 49, 90). Moreover, according to the embodiments shown in FIG. 2, FIG. 3 and FIG. 6, since the clutch mechanism is arranged at the back side of the impeller 2d (impeller shell 49), advantages for simplification of construction are obtainable such that a distance between the impeller 2d (shell 4a) and the housing 2a (22) interposing the clutch mechanism can be shortened, and the casing 4b (60, 75) of the clutch can be decreased in its weight and size, etc. Furthermore, automatic engaging and disengaging controls of the clutch become possible without requiring a control unit from outside at all in case of utilizing the centrifugal clutch, so that the construction of clutch mechanism can be simplified and manufacturing cost thereof may be lessened.

What is claimed is:

1. A power transmission mechanism equipped with a fluid coupling, an input shaft thereof interconnected to a power source being interconnected through the fluid coupling to an output shaft, and the output shaft being interconnected to a forward-rearward changeover mechanism including a speed changer; characterized in that said fluid coupling includes a shell, an impeller in said shell, a centrifugal clutch means in said shell for engaging said impeller and for driving said impeller when said shell is rotated by said input shaft at a speed above idle speed and for disengaging said impeller and the driving of said impeller when said shell is rotated by said input shaft at said idle speed, a turbine in said shell for standing idle in said shell when said centrifugal clutch means is disengaged and for drive by said impeller when said centrifugal clutch means is engaged and for driving said output shaft, said centrifugal clutch means comprising a support member fixed to said shell, a centrifugal shoe mounted on said support member for radial movement outwardly of said support member by centrifugal force and radial movement inwardly toward said support member, spring means for moving said shoe inwardly toward said support member when said shell is rotated at idle speed, a cylindrical casing fixed to said impeller radially outward from said shoe and having an engaging surface for engagement by said centrifugal shoe when said shell is rotated at a speed above idle speed and said centrifugal shoe is moved radially outward by centrifugal force, said forward-rearward changeover mechanism, including said speed changer, being driven by said turbine when said centrifugal clutch means is engaged with said engaging surface and standing idle when said centrifugal clutch means is disengage from said engaging surface and said turbine is standing idle.

2. A power transmission mechanism equipped with a fluid coupling as set forth in claim 1, in which said speed changer is a V-belt type stepless speed changing device.

3. A power transmission mechanism equipped with a fluid coupling as set forth in claim 1, in which said shell is interconnected to a gear pump.

* * * * *